Aug. 23, 1955   J. S. BECKETT ET AL   2,716,065
TELLTALE FOR FROZEN FOOD PACKAGES
Filed June 4, 1951

INVENTORS
JOHN S. BECKETT
WILLIAM J. MARENUS
BY
ATTORNEY

United States Patent Office 2,716,065
Patented Aug. 23, 1955

2,716,065

TELLTALE FOR FROZEN FOOD PACKAGES

John S. Beckett, Glendale, and William J. Marenus, Los Angeles, Calif., assignors to Aseptic Thermo Indicator Company, Los Angeles, Calif., a corporation of California Application June 4, 1951, Serial No. 229,782

10 Claims. (Cl. 99—192)

This invention relates to a telltale device for use in connection with frozen food packages and in particular for a visual telltale device. More particularly it relates to a visual indicator which shows whether or not the contents of a frozen food package has been warmed to a temperature and for a sufficient length of time to cause deterioration to an undesirable or dangerous point of spoilage, or of production of unfavorable odors and tastes. The spoilage of quick frozen food is generally more rapid than spoilage of fresh food and under present marketing conditions for frozen food, it is highly desirable to have a reliable telltale device associated with the frozen food packages to indicate if such packages may have been exposed to conditions of temperature and time which would be likely to produce spoilage. It is a requirement that the telltale accompany the food package from the time it is packed until it reaches the ultimate consumer, and the device must be of such a nature that any re-freezing of the package will not destroy the telltale indication of the prior history of the package as it relates to integrated temperature and time.

The principal object of the present invention is to provide a warning or telltale device for a quick frozen food package which automatically integrates the effect as relates to spoilage, of time and temperature from the initial freezing of the package until it is inspected. Another object is to provide a warning or telltale device which is irreversible in its indication of integrated temperature time effects. A still further object is to provide a visual indicator for a telltale device which indicates generally whether or not there is any danger of the food being spoiled. A further object is to provide a warning or telltale device of the class described which is inexpensive to make and to install in or on the packages and which does not depend for its telltale activity on the specific nature of the food in the package. Yet another object is to provide a telltale device which will perform its function irrespective of its orientation or environment. Another object is to provide a suitable diffusion mass in which the progress of diffusion of dye-effecting ions may be observed visually by means of a moving boundary therein.

These and other objects of the invention are attained by the devices described in the following description, reference being made to the accompanying drawings in which.

Figure 1:
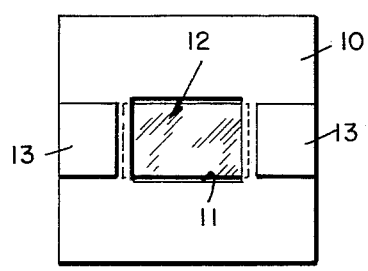
Figure 1 is a plan view of one form of telltale device as arranged on a mounting card.
Figure 2:
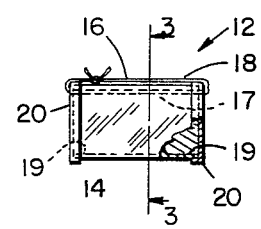
Figure 2 is a plan view of a preferred form of a telltale diffusion cartridge and wick reservoir.
Figure 3:
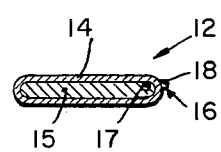
Figure 3 is a cross sectional view taken on the line 3—3 of Figure 2.

Referring to the drawings, the mounted telltale device in a preferred form consists of a thick cardboard mounting 10 having a recessed center opening 11 in which is mounted the diffusion cartridge 12. A band 13 of colored ink is printed on the cardboard in a color which corresponds to the danger-indicating color of the cartridge, and is arranged so that the color comparison between the cartridge and the band is quickly and easily made by observation. The cartridge itself consists of a flattened tubular transparent body 14, such as, for example, glass or polystyrene resin, or the like, which contains a semi-solid diffusion mass 15, and a wick reservoir 16 which is formed in a multiple loop wound inside and outside around one edge of the flattened transparent body, the portion of the wick reservoir inside the body being embedded along one edge of the diffusion mass 15. The open ends 19 of the transparent body 14 are sealed for example by sealing wax plugs 20 or by other suitable means. The semi-solid diffusion mass 15 includes in its composition an indicator dye whose color is changed by a change in the acidity or alkalinity of the diffusion mass 15. The diffusion mass 15 is characterized by being in deformable or semi solid state and in maintaining that state over a long range of temperature. The diffusion mass is also characterized by having in its composition an ionizing liquid, generally water, which permits the ionic diffusion of either an acid or an alkali from the wick reservoir into the diffusion mass 15 at the contact between them along one edge of the cartridge 12.

The wick reservoir 16 in the preferred form of our invention consists of a cotton thread which has been impregnated and coated with an aqueous mucilage solution containing a small amount of a highly ionizing non-volatile acid, for example, sulphuric acid. The wick reservoir 16 may alternatively be impregnated with an alkaline agent, for example, caustic soda, caustic potash, quicklime and the like, along with mucilage or some other binding agent which fixes the aqueous ionic agent in place. The nature of the impregnating agent in the wick reservoir whether acid or alkaline is determined by the type of pH indicator dye which is used in making the diffusion mass 15. Gelatine, agar or polyethylene glycols and the like may be used in place of the mucilage.

For use when there is acid in the wick reservoir, methyl red, propyl red, cresol red, phenol red and Congo red have, individually, been used as the indicator dye in the diffusion mass, and for use when there is alkali in the wick reservoir either brom thymol blue or thymol blue have been used as the indicator dye in the diffusion mass. Other suitable acid or alkali indicating dyes may be used for giving color changes within the diffusion mass as the acid or alkali, as the case may be, migrates by ionic diffusion from the wick reservoir into the diffusion mass.

The composition of the diffusion mass may be varied over wide limits depending upon the temperature range which is to be employed and upon the time temperature rate of ionic diffusion which is desired in the diffusion mass. It is a requirement of the diffusion mass that it contain enough water to permit ionic migration of the acid or alkali from the edge of the mass in contact with the wick reservoir and further, it is necessary that the diffusion mass be a semi-solid which remains in that state over a wide range of temperatures so that it will permit ionic diffusion therethrough.

We have found that the diffusion mass composition should contain essentially in the form of a homogenous stable emulsion (a) a colloidal material capable of attaining a gel form with water and having a high viscosity-temperature gradient, for example, methyl cellulose, casein or starch; (b) a water soluble substance having a high viscosity-temperature gradient adapted to vary the viscosity of the water gel with changes in temperature in order to control the creep rate of the moving acid or alkali boundary, for example, the polyalkylene glycols and certain block-end derivatives thereof; (c) a water insoluble substance having a high viscosity-temperature gradient which may be emulsified with the water solutions of (a) and (b), for example, chlorinated biphenol or the methyl ester of abietic acid; (d) a pH indicator dye; (e) a strongly ionized acid or base such as sulphuric acid or alternatively potassium hydroxide to control the pH of the diffusion mass to retain the original dye color until neutralized by the acid or alkali from the wick reservoir; and optionally (f) an emulsion stabilizer such as bentonite; and (g) a salt, for example, calcium chloride, to improve the sharpness of the boundary in the diffusion mass.

One preferred composition for the diffusion mass consists of the following ingredients in the proportions given:

300 parts by weight of water
40 parts by weight of methyl cellulose
106 parts by weight of polyalkylene glycol (Ucon 50 H B 5100)
62 parts by weight chlorinated biphenol (Monsanto "Aroclor")
0.2 part by weight of propyl red indicator dye
3 parts by weight of potassium hydroxide
5 parts by weight of powdered bentonite
3 parts by weight of calcium chloride The amount of water in the above formula may be varied from about 230 to 370 parts; the methyl cellulose may be varied from 20 to 60 parts by weight; the polyalkylene glycol may be varied from 30 to 170 parts by weight; the chlorinated biphenol may be varied from 15 to 108 parts by weight; the propyl red indicator dye may be varied as desired to get the desired depth of color; the amount of potassium hydroxide may be varied over a range sufficient to give slight alkalinity to the final diffusion mass composition; the bentonite may be varied from 0 to 10 parts by weight; and the calcium chloride may be varied from 0 to 6 parts by weight.

In the preparation of the diffusion mass, I find it desirable to thoroughly mix the ingredients in the following order:

The methyl cellulose is dispersed in the water with the potassium hydroxide, and the indicator dye and the calcium chloride are mixed into the methyl cellulose gel. The bentonite is then added to the mixture and thoroughly mixed, following which the polyalkylene glycol is added and then the chlorinated biphenol, with mixing after the addition of each ingredient.

The semi-solid diffusion mass is injected into or placed in the diffusion cartridges after the wick reservoir 16 has been attached to the transparent body, running inside and outside, as above indicated. The ends of the cartridges are then sealed. It is necessary, of course, that the cartridges, after they are assembled, be kept in a sufficiently low temperature so that diffusion from the wick reservoir does not appreciably progress into the diffusion mass, and cause a color change.

Figure 4:
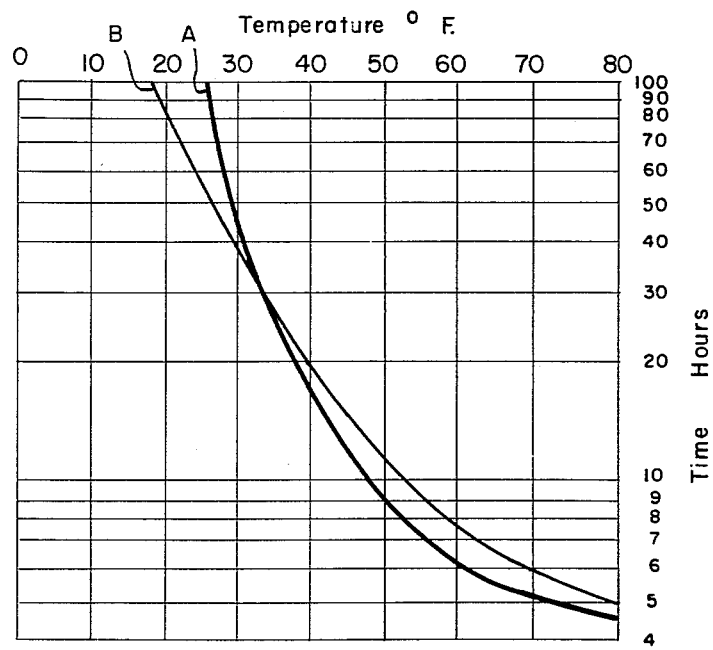
Figure 4 is a diagram showing an average temperature spoilage rate curve.

In Figure 4, there is shown graphically the rate of spoilage of foods when subjected to varying temperatures above the freezing point for varying lengths of time. This spoilage curve is derived from the averages of observed temperatures of spoiling of various common articles of food which are marketed in frozen condition, namely chicken, fish, meat, raw vegetables, prepared foods, ice creams, and the like. A spoilage curve of this kind is, of course, not an absolute indication that actual spoilage will have occurred under the conditions noted, but it does give a criterion of the effect of time and temperature in relation to the rate of deterioration of the frozen food products. Any frozen product which has cumulatively been exposed to the times and temperatures represented by points on the curve would at least be suspect.

The composition of the diffusion mass above described was selected so that its rate of color change will generally correspond with the spoilage curve as shown in Figure 4; that is, the rate of diffusion of the acid or alkali from the wick reservoir 16 through the diffusion mass 15 is such that the dye indicator will be completely transformed across the width of the visible portion of the diffusion mass under the integrated time and temperature conditions as shown on the indicator curve also shown on Figure 4.

The spoilage curve may be expressed by the exponential equation, (1) $$t_s = Pe^{125/T}$$

where $t_s$ is the spoilage time at temperature, $T° F.$ and $P$ is a constant for any one product.

The distance through which the moving boundary of changed indicator color "creeps" at a given temperature, $T° F.$ is given by the equation;

(2) $$t_c = b(T)d^{1.58}$$

where $t_c$ is the time in hours, $d$ is the distance "crept" and $b(T)$ is a function of temperature;

It now remains to evaluate $b(T)$. This may be done by selecting an arbitrary and fixed value for $d$, say $d_0$. Physically, $d_0$ is the actual width of the indicator over which the moving boundary must creep to define "complete reaction" of the indicator.

In order that the indicator should show spoilage under the same conditions of time and temperature as that required for spoilage, $t_s$ must equal $t_c$ so that (3) $$Pe^{125/T} = b(T)d^{1.58}$$ and (4) $$b(T) = Pd^{-1.58}e^{125/T}$$

An average value of $P$ for various products as developed from the questionnaire data is 0.8, so we have selected this value for general use. For specific products, $d$ may be varied merely by changing the "creep distance." $b(T)$, which governs the shape of the curve, may be changed by varying the composition of the indicator material.

Figure 5:
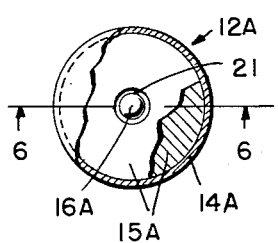
Figure 5 is a top plan view of another form of our invention.
Figure 6:
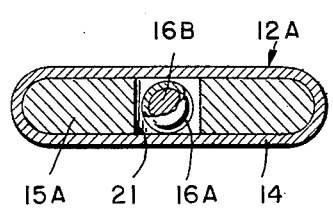
Figure 6 is a cross sectional view taken on the line 5—5 of Figure 5.

Another form of indicator is shown in Figures 5 and 6, in which the reservoir (containing aqueous acid or alkali) is contained in a sealed container of plastic or the like, and placed in the center hole or cavity of a doughnut-shaped diffusion mass, the entire indicator being tightly enclosed in a sealed capsule having at least one transparent side. If this capsule is put in the food before freezing, and frozen along with it, the reservoir container is ruptured by the freezing, and if subsequently the package becomes unfrozen, the ionic diffusion of the reservoir liquid causes a progressive change in the color of the diffusion mass.

A change of oxidation, or of reduction potential, or of ionic valance, by the diffusion of a reduction agent or an oxidizing agent respectively, into the diffusion mass to effect a color change in an ingredient in the diffusion mass at a moving boundary is also contemplated as being within the scope of our invention.

The advantages of our invention will be apparent from the above description including its composition and uses. The use of ionic diffusion to effect color changes in dye indicators, irrespective of the orientation of the device, independent of the contents of the frozen food package, independent of external moisture, and corresponding in the time-temperature integration values with the time-temperature effects upon the spoilage of foods, provides an effective means for showing the prior history of stored frozen food packages and the like. The devices operate with certainty, the indication can not be reversed by refreezing, and the cost of individual indicators is low. The diffusion mass composition may be controlled so that the time-temperature integration curve may be steeper or flatter than the average food spoilage curve which is herein used for illustration.

Where the word "semi-solid" is used in the claims to describe the state or condition of the diffusion mass, it is meant to indicate a somewhat plastic, deformable, putty-like mass which maintains its form without becoming liquid at the higher range of temperatures here involved (room temperatures) and which does not become so rigid or "solid" that no ionic diffusion at all results at the colder temperatures involved.

We claim:

1. A telltale device for a refrigerated package comprising a semi-solid ionic diffusion mass containing a pH indicator substance and water; and a reservoir having water-dispersed ions available at a surface arranged in communication with said diffusion mass, said dispersed ions being selected as to pH to be effective to change the color of said pH indicator substance upon contact therewith when said ions from said reservoir diffuse by ionic migration into said mass.

2. A telltale device for a refrigerated package comprising a semi-solid ionic diffusion mass containing a pH indicator dye and water; and a reservoir having water-dispersed ions available at a surface arranged in communication with said diffusion mass, said dispersed ions being selected as effective to change the color of said indicator dye upon contact therewith when said ions from said reservoir diffuse into said mass; said ionic diffusion mass being characterized by its semi-solid condition over a temperature range from about 15° F. to about 80° F., and its property of diffusing the ions received at the contact with said reservoir by ionic migration in the water distributed in said mass whereby to cause a moving color boundary with said indicator dye.

3. A telltale device for a refrigerated package comprising a semi-solid ionic diffusion mass containing a pH indicator dye and water; and a reservoir having water-dispersed acid ions available at a surface arranged in communication with said diffusion mass, said pH indicator dye changing color in contact with said ions which diffuse into said mass from said reservoir; said ionic diffusion mass being characterized by its semi-solid condition over a temperature range from about 15° F. to about 80° F., and its property of diffusing the ions received at the contact with said reservoir by ionic migration in the water distributed in said mass whereby to cause a progressive change in color in said mass proportional to the accumulated integrated effect of time and temperature.

4. A telltale device for a refrigerated package comprising a semi-solid ionic diffusion mass containing a pH indicator dye and water; and a reservoir having water-dispersed alkali ions available at a surface arranged in communication of said diffusion mass, said pH indicator dye changing color in contact with said ions which diffuse into said mass from said reservoir; said ionic diffusion mass being characterized by its semi-solid condition over a temperature range from about 15° F. to about 80° F., and its property of diffusing the ions received at the contact with said reservoir by ionic migration in the water distributed in said mass whereby to cause a progressive change in color in said mass proportional to the accumulated integrated effect of time and temperature.

5. A telltale device for a refrigerated package comprising a closed container adapted to be attached to said package, said container having at least one transparent side; a semi-solid ionic diffusion mass containing a pH dye indicator and water, enclosed in said container; and a reservoir having water dispersed dye-activating ions in communication with said diffusion mass, said ions being adapted to progressively change the color of the dye in said mass as said dye-activating ions diffuse by ionic migration into said mass.

6. A telltale device for a refrigerated package comprising a closed container adapted to be attached to said package, said container having at least one transparent side; a semi-solid ionic diffusion mass containing a pH dye indicator and water, enclosed in said container; and a reservoir having water dispersed acid in communication with said diffusion mass, said acid being adapted to progressively color the dye in said mass as said acid diffuses by ionic migration into said mass.

7. A telltale device for a refrigerated package comprising a closed container adapted to be attached to said package, said container having at least one transparent side; a semi-solid ionic diffusion mass containing pH dye indicator and water, enclosed in said container; and a reservoir having water dispersed alkali in communication with said diffusion mass, said alkali being adapted to progressively color the dye in said mass as said alkali diffuses by ionic migration into said mass.

8. A telltale device for a refrigerated package comprising a closed container adapted to be attached to said package, said container having at least one transparent side; a semi-solid ionic diffusion mass containing a pH dye indicator and water, enclosed in said container; and a wick-reservoir having water dispersed dye-activating ions absorbed therein, said wick-reservoir being embedded in one edge of said diffusion mass, said dye-activating ions being adapted to progressively color the dye in said mass as said ions diffuse by ionic migration into said mass.

9. A telltale device for a refrigerated package comprising a closed container adapted to be attached to said package, said container having at least one transparent side; a semi-solid ionic diffusion mass containing a pH dye indicator and water, enclosed in said container; and a wick-reservoir having water dispersed acid absorbed therein, said wick-reservoir being embedded in one edge of said diffusion mass, said acid being adapted to progressively color the dye in said mass as said acid diffuses by ionic migration into said mass.

10. A telltale device for a refrigerated package comprising a closed container adapted to be attached to said package, said container having at least one transparent side; a semi-solid ionic diffusion mass containing a pH dye indicator and water, enclosed in said container; and a wick-reservoir having water dispersed alkali absorbed therein, said wick-reservoir being embedded in one edge of said diffusion mass, said alkali being adapted to progressively color the dye in said mass as said alkali diffuses by ionic migration into said mass.

References Cited in the file of this patent

UNITED STATES PATENTS

| | | |
|---|---|---|
| 1,904,445 | Gray | Apr. 18, 1933 |
| 2,086,745 | Sell | July 13, 1937 |
| 2,192,219 | Bosland | Mar. 5, 1940 |
| 2,339,408 | Jacokes et al. | Jan. 18, 1944 |
| 2,447,462 | Harsh | Aug. 17, 1948 |
| 2,460,215 | Chase | Jan. 25, 1949 |
| 2,485,566 | Clark | Oct. 25, 1949 |
| 2,560,537 | Anderson | July 17, 1951 |

FOREIGN PATENTS

| | | |
|---|---|---|
| 600,451 | Great Britain | Apr. 9, 1948 |

OTHER REFERENCES

"Plasticizers and Resins," Monsanto Chem. Co., St. Louis, Mo. (1940), pp. 32, 33 and 34.